(12) United States Patent
Troubat et al.

(10) Patent No.: US 11,164,030 B2
(45) Date of Patent: Nov. 2, 2021

(54) BAGGAGE IDENTIFICATION KIT

(71) Applicant: IDEMIA IDENTITY & SECURITY FRANCE, Courbevoie (FR)

(72) Inventors: Jean-Claude Troubat, Courbevoie (FR); Erik Lucas, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 0 days.

(21) Appl. No.: 16/825,811

(22) Filed: Mar. 20, 2020

(65) Prior Publication Data

US 2020/0302212 A1 Sep. 24, 2020

(30) Foreign Application Priority Data

Mar. 22, 2019 (FR) .................................. 19 02990

(51) Int. Cl.
| | |
|---|---|
| *G06K 9/46* | (2006.01) |
| *H04N 13/239* | (2018.01) |
| *G06K 9/00* | (2006.01) |
| *G06K 9/20* | (2006.01) |
| *H04N 5/33* | (2006.01) |

(52) U.S. Cl.
CPC ........... *G06K 9/46* (2013.01); *G06K 9/00624* (2013.01); *G06K 9/209* (2013.01); *H04N 5/33* (2013.01); *H04N 13/239* (2018.05)

(58) Field of Classification Search
CPC .... B64F 1/368; G06K 9/00624; G06K 9/209; G06K 9/46; H04N 13/239; H04N 5/23218; H04N 5/247; H04N 5/33
See application file for complete search history.

(56) References Cited

U.S. PATENT DOCUMENTS

| | | | |
|---|---|---|---|
| 2006/0273257 A1* | 12/2006 | Roos | G01V 5/0083 250/358.1 |
| 2017/0008644 A1* | 1/2017 | Dinkelmann | G06Q 10/0832 |
| 2018/0018627 A1 | 1/2018 | Ross et al. | |
| 2018/0322483 A1* | 11/2018 | Castro Maillo | B64F 1/368 |
| 2019/0202642 A1* | 7/2019 | Schroader | B65G 39/18 |
| 2019/0339070 A1* | 11/2019 | Ackley | G01B 11/25 |
| 2020/0233901 A1* | 7/2020 | Crowley | G06K 9/00208 |

FOREIGN PATENT DOCUMENTS

WO WO2017098397 A1 6/2017

* cited by examiner

*Primary Examiner* — Farzana Hossain
(74) *Attorney, Agent, or Firm* — Muncy, Geissler, Olds & Lowe, P.C.

(57) ABSTRACT

A device for identifying a bag (100), the device comprising a bag support and at least one acquisition member for acquiring images of the bag along at least two shooting directions that are inclined relative to each other, the acquisition member being connected to an image processing computer unit (2) programmed to control the acquisition member and to extract characteristics representative of the baggage from the images.

10 Claims, 2 Drawing Sheets

BAGGAGE IDENTIFICATION KIT

The present invention relates to the field of transporting baggage, and more particularly to the field of transporting passengers and their baggage.

BACKGROUND OF THE INVENTION

In airports, it is known for each bag to have attached thereto a tag including an identifier enabling the bag to be associated with a passenger and with a flight. However, it can happen that the tag is damaged or lost during baggage handling, thereby degrading its legibility and leading to said bag being misplaced and to the displeasure of its owner. This has harmful consequences for the airline that took charge of the baggage, not only in terms of image, but also in financial terms since the airline is required to compensate a passenger whose baggage has been lost irretrievably. Airlines thus have an incentive to deploy means enabling lost bags to be stored, their owners to be identified, and the bags to be returned to their owners.

Such procedures become increasingly expensive when numerous bags are lost and the time needed to identify their owners is considerable.

OBJECT OF THE INVENTION

An object of the invention is to remedy the above-mentioned drawbacks, at least in part.

BRIEF SUMMARY OF THE INVENTION

To this end, the invention provides a device for identifying a bag, the device comprising a bag support and at least one acquisition member for acquiring images of the bag along at least two shooting directions that are inclined relative to each other, the acquisition member being connected to an image processing computer unit programmed to control the acquisition member and to extract characteristics representative of the baggage from the images.

Thus, identification of the bag is not limited to a tag applied thereto, but extends to any visual characteristic capable of distinguishing it from another bag.

Other characteristics and advantages of the invention appear on reading the following description of a particular and non-limiting embodiment of the invention.

BRIEF DESCRIPTION OF THE DRAWINGS

Reference is made to the accompanying drawings, in which.

DETAILED DESCRIPTION OF THE INVENTION

The invention is described herein in its application to bags travelling in a transport infrastructure such as an airport, a rail station, a bus terminal, a port, . . . and more particularly to bags that are brought in by passengers boarding a vehicle that is to depart from said transport infrastructure, which bags are to travel in the hold of said vehicle in which their owners have taken their places. Naturally, the invention also applies to the baggage of passengers making a connection, where such baggage is inserted into the baggage handling installation by personnel of the transport infrastructure or of the company that has chartered the vehicle. This example is not limiting, and the person skilled in the art will have no technical difficulty in transposing identification of lost baggage in accordance with the invention regardless of the transport infrastructure under consideration.

Figure 2:
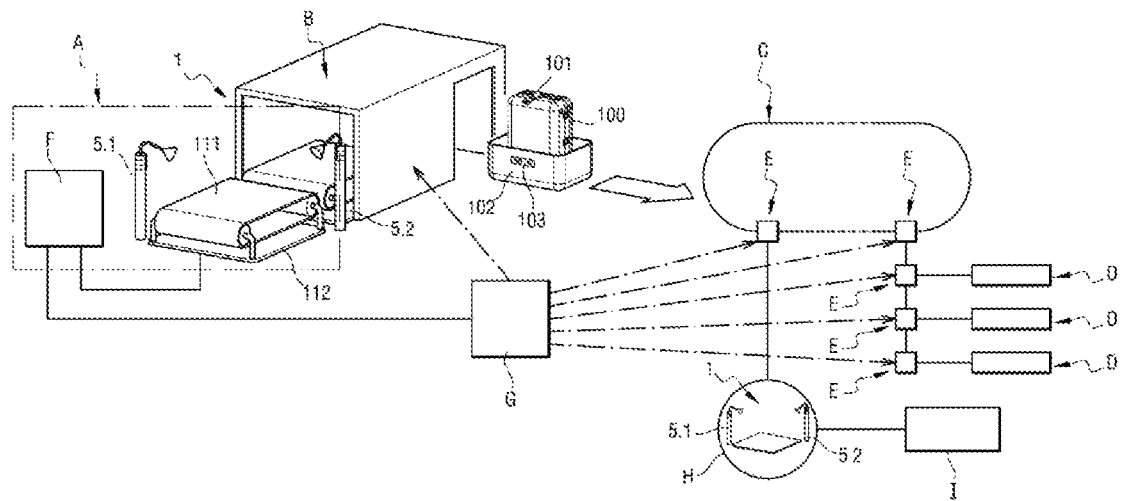
FIG. 2 is a diagrammatic view showing bags travelling in a transport infrastructure.

With reference to FIG. 2, bags 100 travel in a baggage handling installation of a transport infrastructure as follows:

- a passenger brings one or more bags 100 to a check-in desk A where the baggage is weighed and a tracking tag 101 is attached to each bag 100;
- a bag 100 is taken from the check-in desk A to go to a first automatic handling zone B in which the bag 100 is placed in a tray 102 having a radio frequency identification (RFID) chip 103;
- the tray 102 is inserted in a transport circuit C (it should be observed that FIG. 2 is not to scale) that serves a plurality of loading bays D and that includes switches E that are controlled as a function of the RFID chip 103 in order to bring the tray 102 to the loading bay D that corresponds to the vehicle that is to be taken by the owner of the bag 100. The transport circuit C includes conventional means for moving the trays 102, and in particular motor-driven rollers, conveyor belts, downward slides, elevators, . . .
- at the loading bay D, the bag 100 is loaded into a cart that is taken to the vehicle so as to enable the baggage to be loaded into the hold of said vehicle.

The check-in desk A has a conveyor belt 110 for taking the bag 100 to the transport circuit C. The conveyor belt 110 includes a weighing segment 111 with a weighing member 112 connected to a computer terminal F that is connected to a computer system G for managing passengers and baggage. The computer terminal F is programmed to:

- access the reservations for a trip (such as a particular flight, train, bus, or boat) run by an operator of a transport infrastructure, such as an airline;
- issue boarding cards for passengers, the card including in particular the name of the passenger, the number and the times of the trip, the boarding gate . . .
- issue tracking tags 101 including a number associating in particular the name of the passenger with the number of the trip; and
- store the number of each tracking tag 101 in a database associating the name of the passenger, the passenger's trip, and the number of the tracking tag 101 attached to each bag 100 of the passenger's baggage.

The management computer system G hosts the above-mentioned database and is programmed to associate the number of the tracking tag 101 attached to the bag 100 with the RFID chip 103 of the tray 102, and to control the switches E as and when they are reached by the tray 102 so that the switches E direct the tray 102 to the loading bay D corresponding to the trip. In conventional manner, RFID chip readers are arranged upstream from each switch E to identify the tray approaching the switch in question and to control the switch appropriately.

The baggage handling installation also includes a zone H for recovering misplaced bags. Bags may become misplaced as a result of the tracking tag 101 being poorly legible or absent, or of the RFID chip 103 being poorly legible. In this zone H, an operator attempts to decipher the tracking tag 101 in order to be able to put the bag and its tray back into the transport circuit C, and if that fails, to direct the bag to a storage area I for lost baggage where the bag will be registered so that it can be reclaimed by its owner. Baggage is taken to the zone H automatically by the switches E or else by an agent of the transport infrastructure operator.

The check-in desk A and the zone in H are each provided with a respective baggage identification device, given overall reference 1, as described in detail below.

Figure 1:
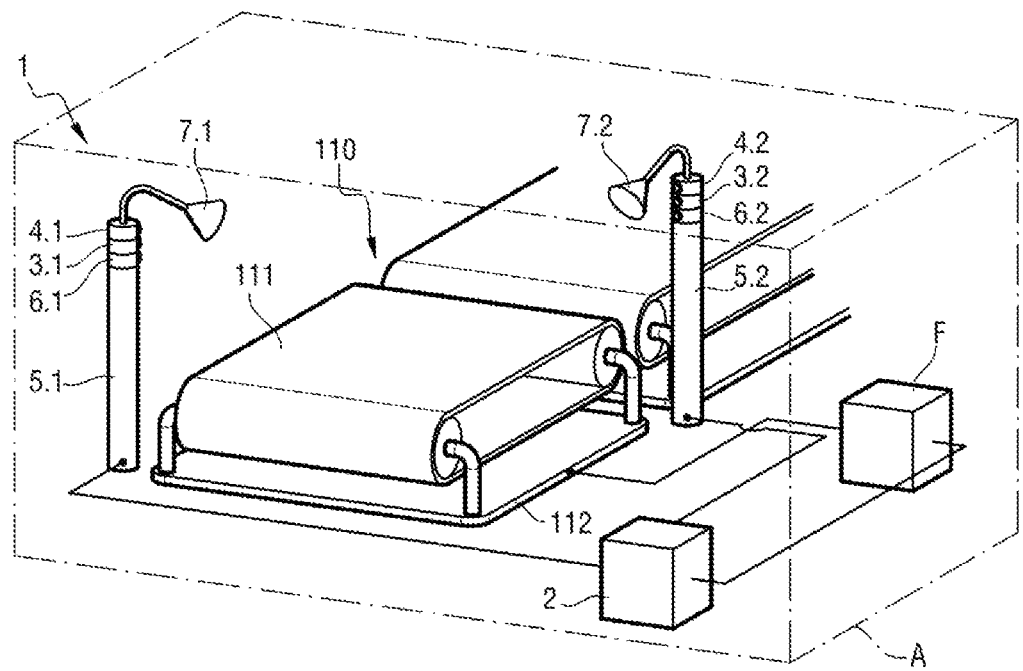
FIG. 1 is a diagrammatic view of a device for identifying a bag that is used during a stage of checking in a bag.

With reference to FIG. 1, the identification device 1 comprises a bag support and at least one acquisition member for acquiring images of the baggage from at least two shooting directions that are inclined relative to each other, and a computer unit 2 for processing images and programmed to control the acquisition member and to extract characteristics representative of the baggage from the images. The term "directions that are inclined relative to each other" is used to mean that the projections of the two shooting directions onto a horizontal plane form a non-zero angle between each other, and the projections of the two shooting directions onto a vertical plane form a non-zero angle between each other.

In this example, the acquisition member comprises two pairs of optical sensors 3.1 & 4.1 and 3.2 & 4.2 that are connected to the computer unit 2 for processing images. The sensors 3.1 and 3.2, and the sensors 4.1 and 4.2 are sensitive to different wavelength ranges. More precisely, the sensors 3.1 & 4.1 are constituted by respective pairs of cameras that are sensitive to infrared radiation, and the sensors 3.2 and 4.2 are constituted by respective cameras that are sensitive to visible radiation. The cameras in each sensor 3.1 and 3.2 are arranged relative to each other so as to provide stereoscopic vision and distance measurement.

Each pair of sensors 3.1 & 4.1 and 3.2 & 4.2 is mounted on a respective post 5.1 or 5.2.

The posts 5.1 and 5.2 are of different heights and they stand vertically at positions that are diametrically opposite about a center of the bag support.

Each post 5.1, 5.2 also carries a respective emitter 6.1, 6.2 for emitting a structured light beam having wavelengths lying in the infrared range, and a respective lamp 7.1, 7.2 for illuminating the support in the visible range. The emitters 6.1, 6.2 and the lamps 7.1, 7.2 are connected to the computer unit 2. Thus, each of the sensors 3.1 and 3.2 can measure the distance between said sensor and light spots projected by the corresponding emitter 6.1 or 6.2 on the bag in order to make a three-dimensional (3D) representation of the bag (depth map).

In conventional manner, the computer unit 2 comprises a processor and a memory containing a program having instructions arranged to process the images provided by the sensors 3.1, 4.1, 3.2, and 4.2 and to extract therefrom distinctive characteristics that are visual and that comprise, in non-limiting manner: the shape and the dimensions of a bag, the color of the bag, the brightness of the bag, the shape and the dimensions of a handle of the bag, the shape and the dimensions of wheels, a profile of at least one of the edges of the bag, the shape and the dimensions of a pattern present on the bag, . . . .

More precisely, the images provided by the cameras 3.2, 4.2 enable most of the visual distinctive characteristics of the bag 100 to be determined, and in particular its color as it appears as a result of the illumination provided by the lamps 7.1, 7.2 (since this illumination is constant for all of the devices, the color of a bag always appears in the same manner regardless of which device is being used). The lamps 7.1 and 7.2 are also selected so as to ensure that the bag is illuminated sufficiently to acquire images that are sharp, given the sensitivity and the speeds of the optoelectronic sensors of the cameras.

The images provided by the cameras 3.1 and 4.1 enable most of the visual distinctive characteristics of the bag 100 to be determined, and in particular its shape and its dimensions, by means of the structured light beams that are projected onto the bag 100 by the emitters 6.1 and 6.2.

In this example, the identification device 1 of the check-in desk A is located in the vicinity of the weighing segment 111. More precisely, the weighing segment 111 forms the bag support of the identification device 1. The posts 5.1 and 5.2 thus stand on either side of said weighing segment 111. This positioning is advantageous since, during the weighing operation, the bag 100 is stationary on the weighing segment 111, thereby facilitating image capture.

The computer unit 2 of the identification device 1 is programmed to determine both contextual and visual distinctive characteristics of each bag 100 and to transmit them to the management computer system G so that the contextual and visual distinctive characteristics are stored in the database in association with the name of the passenger and the transport vehicle chartered for the trip to be taken by the passenger and the passenger's baggage.

In this example, the identification device 1 of the zone H is located in the vicinity of a platform that forms the bag support of the identification device 1, with the posts 5.1 and 5.2 standing on either side of said table.

The computer unit 2 of this identification device 1 is programmed to determine both the contextual and the visual distinctive characteristics of each bag 100 and to transmit them to the management computer system G so that the transmitted contextual and visual distinctive characteristics can be compared with those stored in the database in order to retrieve the name of the passenger to whom a bag 100 in the zone H belongs, and/or to retrieve the transport vehicle that is to carry said bag 100.

Figure 3:
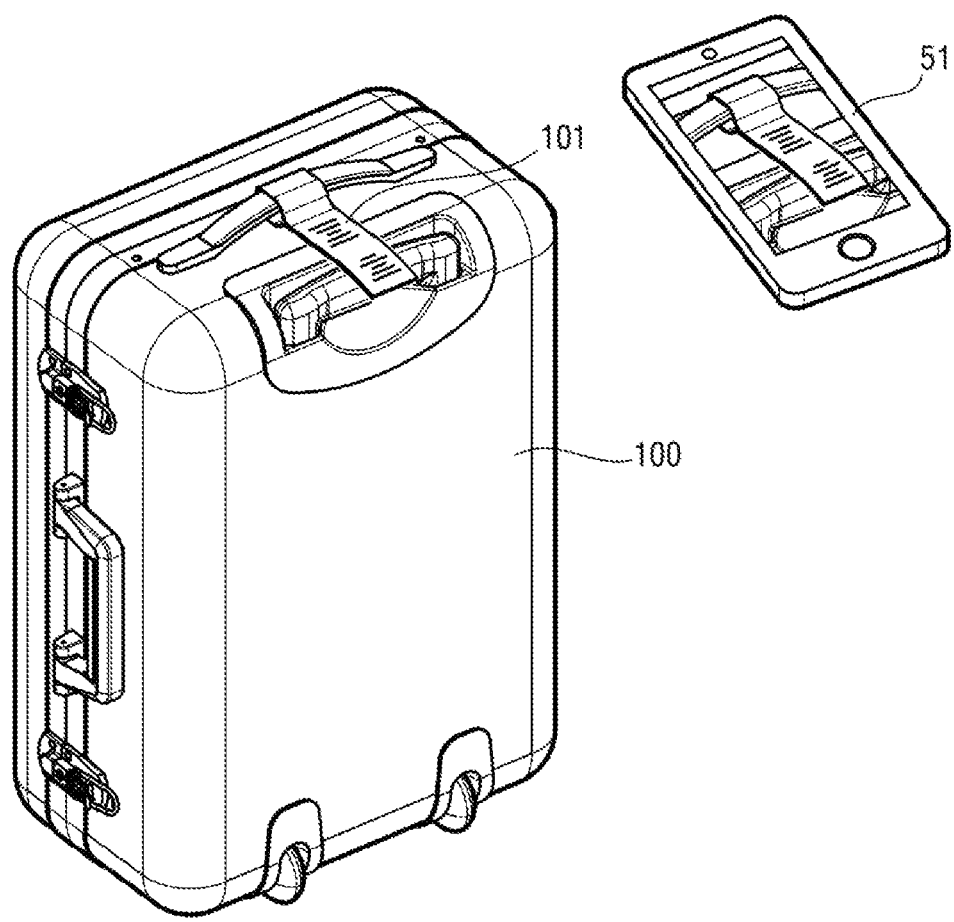
FIG. 3 is a diagrammatic view showing a step of recognizing a bag.

Provision is also made to provide certain agents of the operator with telecommunication terminals 51 of the smartphone type, such as the terminal shown in FIG. 3, which terminals execute an identification program that comprises the following steps:

controlling the camera of the terminal in order to acquire images of a bag 100 while asking the operator to move the terminal so that images are captured from a plurality of shooting directions; and extracting distinctive characteristics from these images and transmitting them to the management computer system G so that it can compare them with the distinctive characteristics stored in the database and retrieve the name of the passenger who owns the bag 100 and/or the transport vehicle that is to carry said bag; or transmitting the images to the management computer system G so that it can extract the distinctive characteristics and compare them with the distinctive characteristics stored in the database and retrieve the name of the passenger owning the bag 100 and/or the transport vehicle that is to carry said bag.

The baggage transport installation, and the identification devices 1 and 51 enable a baggage tracking method to be implemented, which method comprises a registering stage and a recognition stage.

The registering stage, which takes place at the check-in desk A, comprises the following steps:

weighing the bag 100 and storing its weight (where its weight constitutes a contextual distinctive characteristic of the bag 100) in association with an identifier in the database hosted in the memory of a computer unit of the management computer system G;

while weighing, capturing images of the bag 100 in the check-in desk A by means of the identification device 1 and extracting visual distinctive characteristics therefrom by means of the image processing computer program executed by the computer unit 2; and storing the visual distinctive characteristics together with the identifier, specifically the passenger's name, the passenger's trip number, and timestamp data (where timestamp data constitutes another contextual distinctive characteristic of the bag 100) in the database hosted in the memory of a computer unit of the management computer system G.

The recognition stage, which takes place in the zone H or in any other location by using the telecommunication terminal 51, comprises the following steps:

capturing images of a bag 100 that is to be recognized and extracting visual distinctive characteristics therefrom by means of the image processing computer program executed by the computer unit 2, if an identification device 1 is being used, or by the telecommunication terminal;

using a recognition program to compare the visual distinctive characteristics as extracted during the recognition stage with the visual distinctive characteristics stored together with timestamp data lying in a predetermined time range, and calculating a similarity score; and considering that the bag has been recognized when the similarity score is greater than or equal to a predetermined threshold.

It should be observed, that in order to accelerate the processing, the bag that is to be recognized is weighed during the recognition stage and the distinctive characteristics extracted during the recognition stage are compared only with distinctive characteristics that are stored with a weight similar to the weight of the bag 100 that is to be recognized. This operation may be performed in the zone H if the identification device 1 in this zone is provided with a weighing device.

Naturally, the invention is not limited to the embodiment described and covers any variant coming within the ambit of the invention as defined by the claims.

In particular, the acquisition device 1 may be of a structure different from that described.

The acquisition member may comprise a single camera that is mounted to move around the bag support or it may comprise more than two cameras, for example three cameras placed around the support.

Each post may carry only one camera, or two cameras that are sensitive to the same wavelengths but that look in different directions and/or that are at different heights.

The acquisition member may comprise at least two optical sensors 3.1, 3.2, 4.1, 4.2 that are connected to the image processing computer unit 2 and that are mounted on a respective post 5.1, 5.2 at different heights, the post being diametrically opposite about a center of the support.

The acquisition member may comprise four optical sensors connected to the image processing computer unit 2 and mounted on respective posts 5.1, 5.2, the posts being uniformly distributed around the support.

The device may have some other number of posts, e.g. one, two, three, or four posts each carrying one or more optical sensors. The four-post solution is very advantageous since it makes it possible to obtain relatively detailed images of the entire periphery of the bag and of its top surface. Only the bottom surface of the bag is not visible. Nevertheless, it should be observed that it is possible to provide a support that is transparent or that has sufficient perforations, with at least one optical sensor being arranged beneath it to capture an image of the bottom surface of the bag.

The use of stereoscopic cameras is optional.

The identifier is the name of the holder of the bag during check-in or a number that can be read from a tag carried by the bag.

The registering stage may be performed during the operation of weighing the baggage, or at some other moment, and for example during a dedicated operation.

The portable camera may form part of a dedicated portable identification device that is configured to communicate with the computer unit hosting the database.

The visual distinctive characteristics may be acquired from the weighing segment, but they may also be acquired anywhere along the baggage path. For example, they may be acquired in a time stamping and/or baggage locating system arranged at some point along the baggage path.

The bag support may be mounted on a weighing member 112.

The bag support may be a conveyor belt 111.

Optionally, upstream from the recognition stage, the method may include the step of determining the contextual distinctive characteristics of the bag 100; and during recognition, the steps of:

using a comparison program to compare the extracted contextual distinctive characteristics with the stored contextual distinctive characteristics, and to calculate a similarity score; and filtering and conserving the checked-in baggage data for bags having stored contextual distinctive characteristics for which the similarity score corresponds to a value lying in a predetermined range.

By way of example, said contextual distinctive characteristics may be weight data or timestamp data lying in a predetermined time range, or any other data.

It is possible to use only one contextual distinctive characteristic (weight, timestamp data, or some other data), or not to use any contextual distinctive characteristic at all.

The invention is applicable to any baggage handling infrastructure such as ports, rail stations, bus terminals, airports, . . .

The invention claimed is:

1. A device for identifying a bag, the device comprising: a bag support; and at least one acquisition member for acquiring images of the bag along at least two shooting directions that are inclined relative to each other, the acquisition member being connected to an image processing computer unit programmed to control the acquisition member and to extract characteristics representative of the bag from the images, the acquisition member comprising at least two optical sensors connected to the image processing computer unit and each mounted on a post at different heights, the posts being separate from each other and diametrically opposite on either side of a center of the bag support.

2. The device according to claim 1, comprising two optical sensors on each post, the two optical sensors being sensitive to different wavelength ranges.

3. The device according to claim 2, wherein each post carries an optical sensor that is sensitive in particular to infrared radiation, and an optical sensor that is sensitive in particular to visible radiation.

4. The device according to claim 1, wherein the acquisition member comprises four optical sensors connected to the image processing computer unit and each mounted on a respective post, the posts being uniformly distributed around the bag support.

5. The device according to claim 1, wherein the image acquisition member comprises two cameras arranged to provide stereoscopic vision.

6. The device according to claim 5, including an emitter for emitting a structured light beam.

7. The device according to claim 1, including at least one lamp for illuminating the bag support.

8. The device according to claim 1, wherein the bag support is mounted on a weighing member.

9. The device according to claim 1, wherein the bag support is a conveyor belt.

10. The device according to claim 1, wherein the distinctive characteristics comprise at least one of the following characteristics: the shape and/or the dimensions of a bag, the color of the bag, the shape and/or the dimensions of a handle of the bag, the shape and/or the dimensions of wheels, a profile of at least one of the edges of the bag, the shape and/or the dimensions of a pattern present on the bag.

* * * * *